(12) United States Patent
Ishi

(10) Patent No.: US 6,546,502 B1
(45) Date of Patent: Apr. 8, 2003

(54) INFORMATION RECORDING METHOD AND APPARATUS OF OPTICAL DISC

(75) Inventor: Masashi Ishi, Mito (JP)

(73) Assignee: JVC Victor Company of Japan, Limited (JP)

( * ) Notice: Subject to any disclaimer, the term of this patent is extended or adjusted under 35 U.S.C. 154(b) by 0 days.

(21) Appl. No.: 09/407,454

(22) Filed: Sep. 28, 1999

(30) Foreign Application Priority Data

Sep. 29, 1998 (JP) .......................................... 10-274787

(51) Int. Cl.⁷ ................................................ G06F 11/00
(52) U.S. Cl. ................................................ 714/7; 714/8
(58) Field of Search .............................. 714/8, 5, 42, 6, 714/7; 711/112; 369/53.16, 53.17, 47.14, 275.2

(56) References Cited

U.S. PATENT DOCUMENTS

| | | | | |
|---|---|---|---|---|
| 4,984,230 A | * | 1/1991 | Satoh et al. .................. | 369/54 |
| 5,132,956 A | * | 7/1992 | Ichikawa .................... | 369/54 |
| 5,142,515 A | * | 8/1992 | McFerrin et al. ............. | 369/32 |
| 5,202,876 A | * | 4/1993 | Takagi et al. ................ | 369/58 |
| 5,235,585 A | * | 8/1993 | Bish et al. ................... | 369/54 |
| 5,237,553 A | * | 8/1993 | Fukushima et al. ....... | 369/275.3 |
| 5,241,531 A | * | 8/1993 | Ohno et al. ............... | 369/275.2 |
| 5,508,989 A | * | 4/1996 | Funahashi et al. ........... | 369/58 |
| 5,844,911 A | * | 12/1998 | Schadegg et al. ......... | 371/10.2 |
| 5,883,867 A | * | 3/1999 | Yamamuro .................. | 369/54 |
| 6,025,966 A | * | 2/2000 | Nemazie et al. ............ | 360/53 |
| 6,049,515 A | * | 4/2000 | Yamamuro .................. | 369/48 |
| 6,134,214 A | * | 10/2000 | Takagi et al. ............ | 369/275.3 |
| 6,212,647 B1 | * | 4/2001 | Sims, III et al. .............. | 714/8 |
| 6,279,118 B1 | * | 8/2001 | Kang ............................ | 714/7 |
| 6,292,625 B1 | * | 9/2001 | Gotoh et al. ............... | 386/125 |
| 6,341,109 B1 | * | 1/2002 | Kayanuma ............... | 369/47.14 |
| 2002/0031069 A1 | * | 3/2002 | Nakane et al. .......... | 369/53.15 |

FOREIGN PATENT DOCUMENTS

JP 4-028061 1/1992 ............ G11B/7/00

* cited by examiner

Primary Examiner—Robert Beausoliel
Assistant Examiner—Marc M Duncan
(74) Attorney, Agent, or Firm—Anderson Kill & Olick; Eugene Lieberstein; Michael N. Meller

(57) ABSTRACT

In case of recording the file 13 of the storage device 6 into the optical disc 3, such data to be recorded as being concerned about a deterioration of reading rate, when the data is reproduced from an optical disc, are recorded with avoiding recording into a linear replacement sector.

4 Claims, 9 Drawing Sheets

| PDL IDENTIFICATION DATA |
|---|
| FIRST PHYSICAL ADDRESS OF DEFECTIVE SECTOR |
| SECOND PHYSICAL ADDRESS OF DEFECTIVE SECTOR |
| THIRD PHYSICAL ADDRESS OF DEFECTIVE SECTOR |

Fig. 2   Prior Art

| SDL IDENTIFICATION DATA |
|---|
| FIRST HEAD SECTOR PHYSICAL ADDRESS OF DEFECTIVE BLOCK |
| FIRST HEAD SECTOR PHYSICAL ADDRESS OF SPARE BLOCK |
| SECOND HEAD SECTOR PHYSICAL ADDRESS OF DEFECTIVE BLOCK |
| SECOND HEAD SECTOR PHYSICAL ADDRESS OF SPARE BLOCK |
| THIRD HEAD SECTOR PHYSICAL ADDRESS OF DEFECTIVE BLOCK |
| THIRD HEAD SECTOR PHYSICAL ADDRESS OF SPARE BLOCK |

Fig. 3   Prior Art

INFORMATION RECORDING METHOD AND APPARATUS OF OPTICAL DISC

BACKGROUND OF THE INVENTION

1. Field of the Invention

The present invention relates to an information recording method and apparatus of an optical disc, particularly, relates to an information recording method of a rewritable optical disc, which controls a process of writing information into a replacement sector to a secondary defective sector and improves a reading rate of data.

2. Description of the Related Art

Generally, a rewritable optical disc is composed of a lead-in area, a data area, and a lead-out area as shown in FIG. 1. The data area is divided into a plurality of zones. A user region and a spare region are provided for each zone of the data area. In case that a defective sector is presented in a user region or a spare region, a recording/reproducing apparatus for an optical disc allocates a logical sector number to a sector in a spare region. Since a host computer makes access to an optical disc in accordance with a logical sector number, the host computer is not necessary to recognize a defective sector.

In a recording/reproducing system of a rewritable optical disc such as a DVD-RAM (Digital Video Disc- or Digital Versatile Disc-Random Access Memory), a defective sector is registered in 4 defect management areas (DMAs) 1 through 4. which are provided in a lead-in area and a lead-out area as shown in FIG. 1. A recording/reproducing apparatus for an optical disc determines a logical sector number with referring the DMAs.

Each DMA comprises a DDS (Disc Definition Structure), a PDL (Primary Defect List), and a SDL (Secondary Defect List). A same defective sector information is recorded in the 4 DMAs. As shown in FIG. 2, PDL identification (ID) data and a number list of a primary defective sector, which are found while certifying a data area prior to utilizing an optical disc, are recorded in the PDL. As shown in FIG. 3, SDL ID data and a head sector number of a defective block, which are found while utilizing an optical disc, and a number list of a head sector of a spare block, which corresponds to the defective block, are recorded in a SDL. In addition thereto, all sectors included in the defective block, which is recorded in the SDL, are treated as a secondary defective sector and they are replaced by sectors included in the spare block corresponding to the defective block. Further, DDS ID data and certifying information are recorded in a DDS, although they are not shown.

Allocating a logical sector number to a sector in a spare region is performed by a method of slip replacement for a primary defective sector registered in a PDL and by a method of linear replacement for a secondary defective sector included in a defective block registered in a SDL.

A method of slip replacement is depicted in FIGS. 4(a) and 4(b). In case that no defective sector is presented, the method is shown in FIG. 4(a). A physical sector number is allocated to a sector in a direction from an inner circumference to an outer circumference and is allocated to each sector provided in a user region and a spare region. A logical sector number is continuously allocated to each sector provided only in the user region.

In case that a defective sector is presented, the slip replacement is depicted in FIG. 4(b). A logical sector number, which shall be basically allocated to the defective sector, is allocated to a first normal sector continuously succeeding the defective sector. Accordingly, if there existed "m0" defective sectors and "m1" defective sectors in the user region, a logical sector number is allocated to "(m0+m1)" replacement sectors slipping in the spare region. In this case, a logical sector number is allocated in numerical order of usable physical sector numbers.

On the other hand, a method of linear replacement is performed by a unit of block composed of 16 sectors, which are a minimum unit of reading and writing from/on a optical disc, with adding data for error correction as shown in FIG. 5. A physical sector number is allocated in a direction from an inner circumference to an outer circumference and assigned to each sector one by one as the same manner as that of the method of slip replacement shown in FIGS. 4(a) and 4(b). In case that "n0" defective blocks and "n1" defective blocks are presented in a user region as shown in FIG. 5, total "(n0+n1)" blocks in a spare region are assigned as replacement blocks. In the method of linear replacement, a logical sector number, which is originally allocated to a sector in a defective block, is allocated to a sector in a block secured in the spare region. Accordingly, sectors in the user region and sectors in the spare region are alternatively arranged in line, in case that those sectors are arranged in accordance with an order of logical sector number. Although defective sectors are designated in the user region in FIG. 5, the linear replacement is also applied to a sector of a defective block presented in the spare region.

According to the linear replacement mentioned above, an optical head of a recording/reproducing apparatus moves reciprocally from a user region to a spare region and vice versa at each time when reading from or recording to a sector, that is, a replacement sector of a secondary defective sector in a block by the linear replacement, which is a block of being secured in a spare region, occurs. It causes a problem of deteriorating an average transfer rate. Accordingly, in case that information are written in a digital video file, which is desired to be reproduced continuously, by applying the linear replacement frequently, reproduction of digital video, which is an operation of reading, may be intermittent.

SUMMARY OF THE INVENTION

Accordingly, in consideration of the above-mentioned problems of the prior art, an object of the present invention is to provide an information recording method of an optical disc, which is applied to such data as being seriously concerned about deterioration of reading rate, in order to eliminate such deterioration of reading rate by utilizing a process of linear replacement, which is a method of processing a replacement sector to a secondary defective sector in an optical disc.

In order to achieve the above object, the present invention provides, according to an aspect thereof, an information recording method of an optical disc, which performs a linear replacement process as a process of a replacement sector to a secondary defective sector in a rewritable data area provided in a rewritable optical disc, the information recording method comprising a step of reading out information from a file to be recorded on the optical disc, a step of discriminating an identification signal, a step of judging whether or not writing the file into a linear replacement sector is prohibited, a step of writing information into a predetermined region in the data area of the optical disc, and another step of writing data into another predetermined region in the data area of the optical disc, the information recording method is further characterized by whether or not writing information in the replacement sector to the secondary defective sector is performed when the information is written into the data area.

According to an aspect of the present invention, there provided an information recording method of an optical disc, which is a recording method of writing file data of being concerned about deterioration of reading rate while reproducing with avoiding recording the file data into a linear replacement sector.

According to another aspect of the present invention, there provided an information recording apparatus of an optical disc, which performs a linear replacement process as a process of a replacement sector to a secondary defective sector in a data area of rewritable provided in a rewritable optical disc, the information recording apparatus comprising means for reading out information from a file to be recorded on the optical disc, means for discriminating an identification signal, means for judging whether or not writing said file into a linear replacement sector is prohibited, means for writing information into a predetermined region in the data area of the optical disc, and another means for writing data into another predetermined region in the data area of the optical disc, the information recording apparatus is further characterized by whether or not writing information in the replacement sector to the secondary defective sector is performed when the information is written into the data area.

Other object and further features of the present invention will be apparent from the following detailed description when read in conjunction with the accompanying drawings.

BRIEF DESCRIPTION OF DRAWINGS

FIG. 2 shows a content of a PDL (Primary Defect List) according to the prior art.

FIG. 3 shows a content of a SDL (Secondary Defect List) according to the prior art.

DETAILED DESCRIPTION OF THE PREFERRED EMBODIMENTS

[Embodiment]

Figure 1:
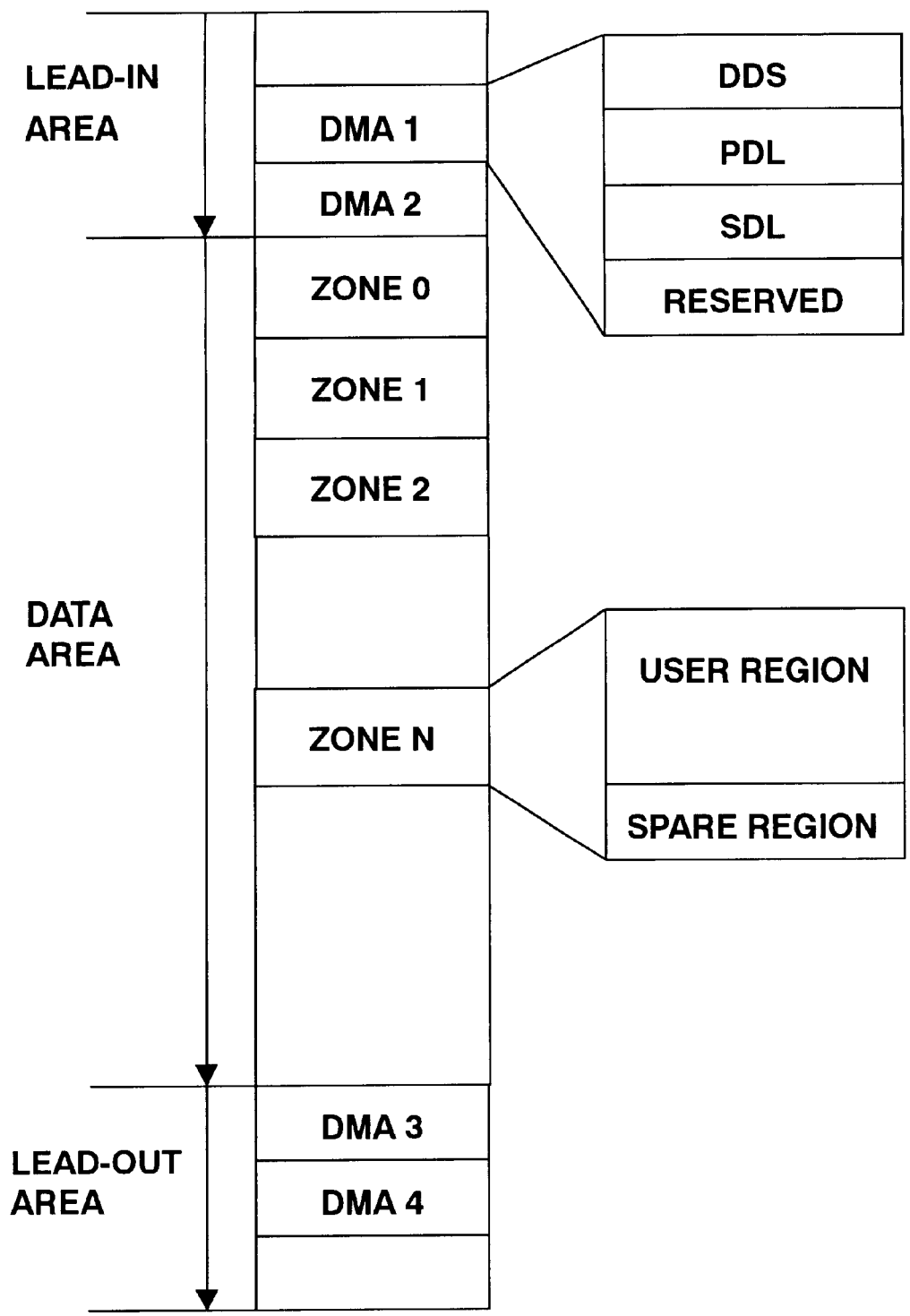
FIG. 1 shows a configuration of an optical disc according to the prior art.
Figure 4A:
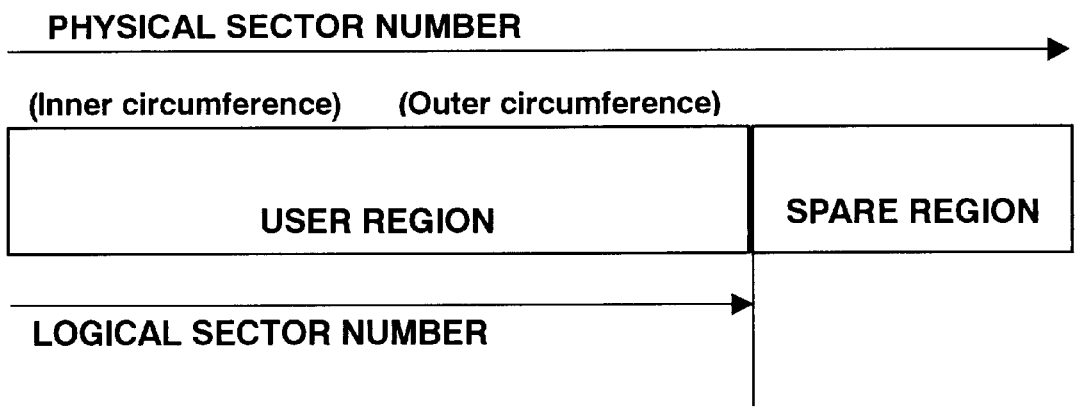
FIG. 4(a) shows a method of slip replacement, in case that no defective sector is presented, according to the prior art.
Figure 4B:
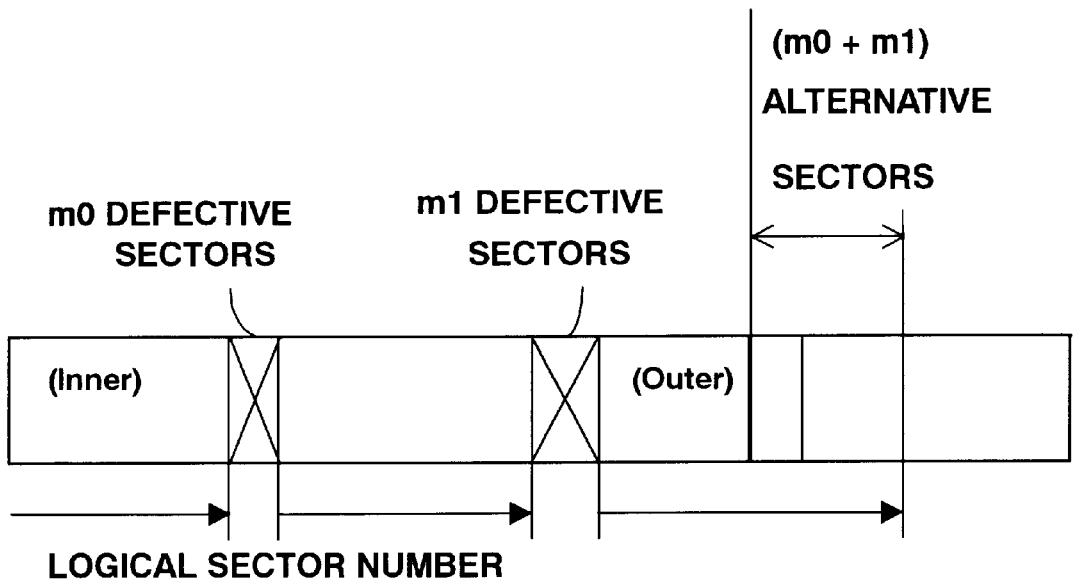
FIG. 4(b) shows a method of slip replacement, in case that a defective sector is presented, according to the prior art.
Figure 5:
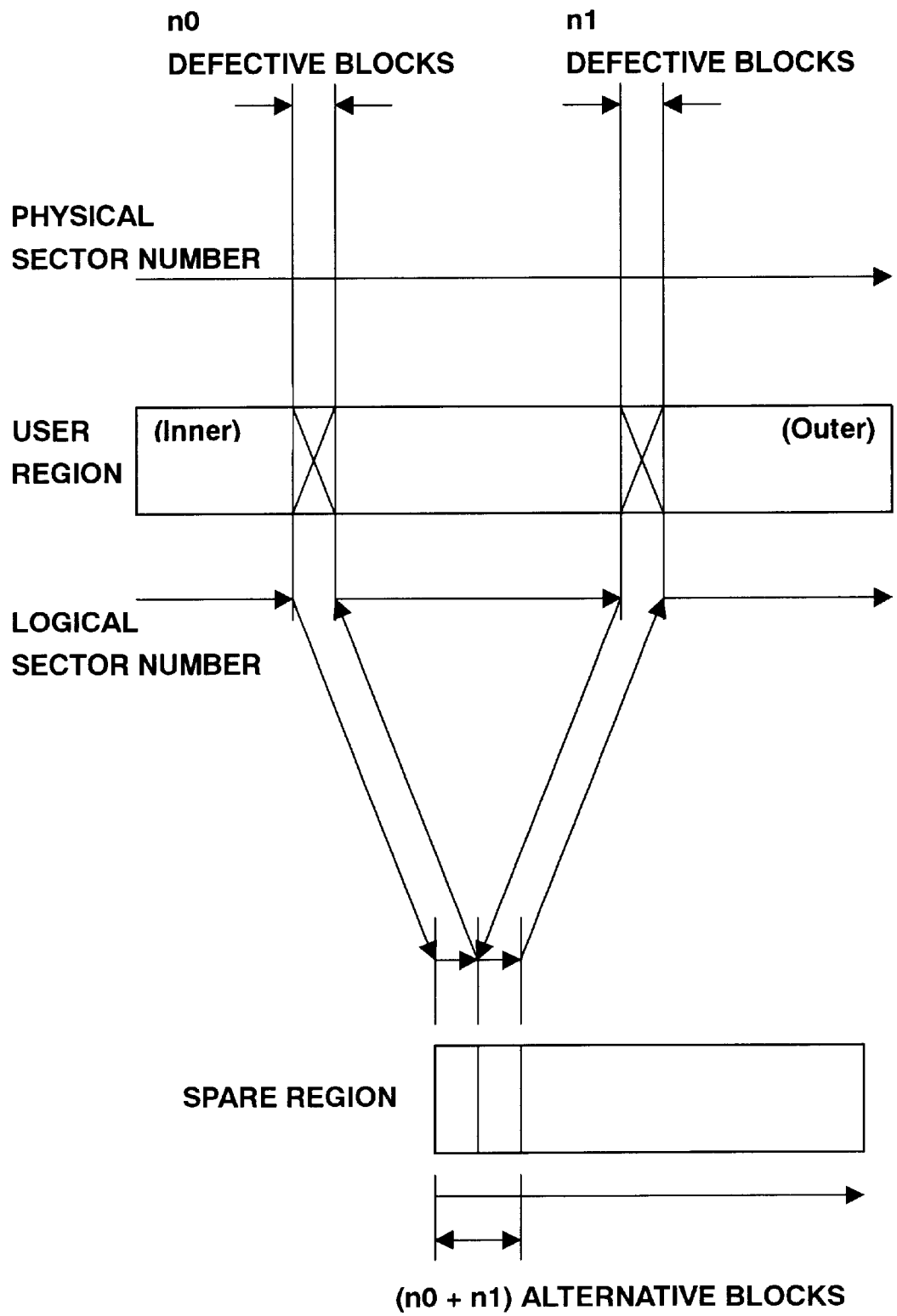
FIG. 5 shows a method of linear replacement according to the prior art.
Figure 6:
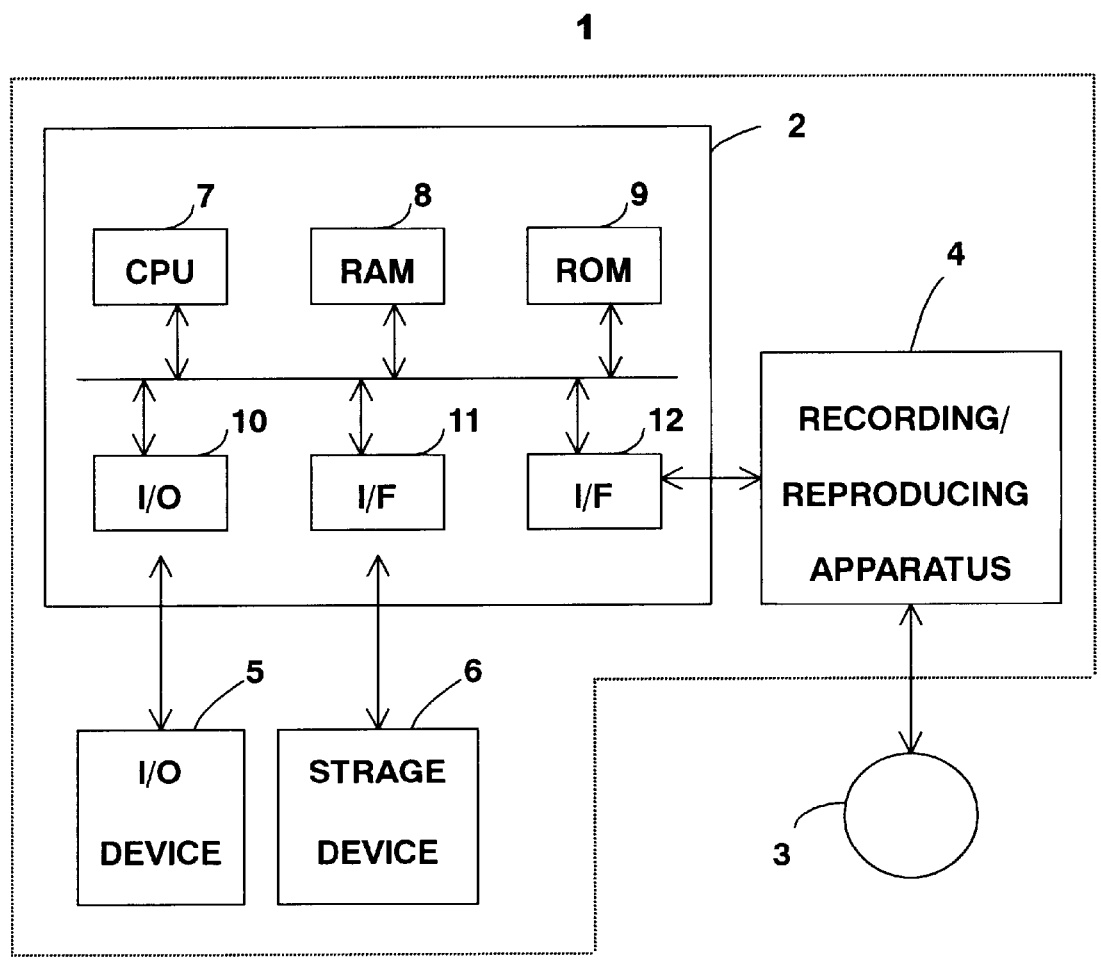
FIG. 6 shows a configuration of a recording/reproducing system of an optical disc according to an embodiment of the present invention.

FIG. 6 is a configuration of a recording/reproducing system of an optical disc according to an embodiment of the present invention. In FIG. 6, a recording/reproducing system 1 of an optical disc comprises a host computer 2, a recording/reproducing apparatus 4 of an optical disc, an input/output (I/O) device 5, and a storage device 6. The host computer 2 controls the recording/reproducing system 1 totally. The recording/reproducing apparatus 4 records or reproduces an optical disc 3. The I/O device 5 includes a monitor, a keyboard, and a mouse necessary to operate the recording/reproducing system 1. The storage device 6 includes a floppy disc drive and a hard disc drive in order to memorize an operating system (OS), which operates in the host computer 2, an application software, and a data file.

The host computer 2 further comprises a CPU (Central Processing Unit) 7 controlling total operation of the host computer 2, a RAM (Random Access Memory) 8, a ROM (Read Only Memory) 9, an input/output (I/O) circuit 10 for the I/O device 5, an interface (I/F) circuit 11 for the storage device 6, and another I/F circuit 12 for the recording/reproducing apparatus 4.

Figure 7:
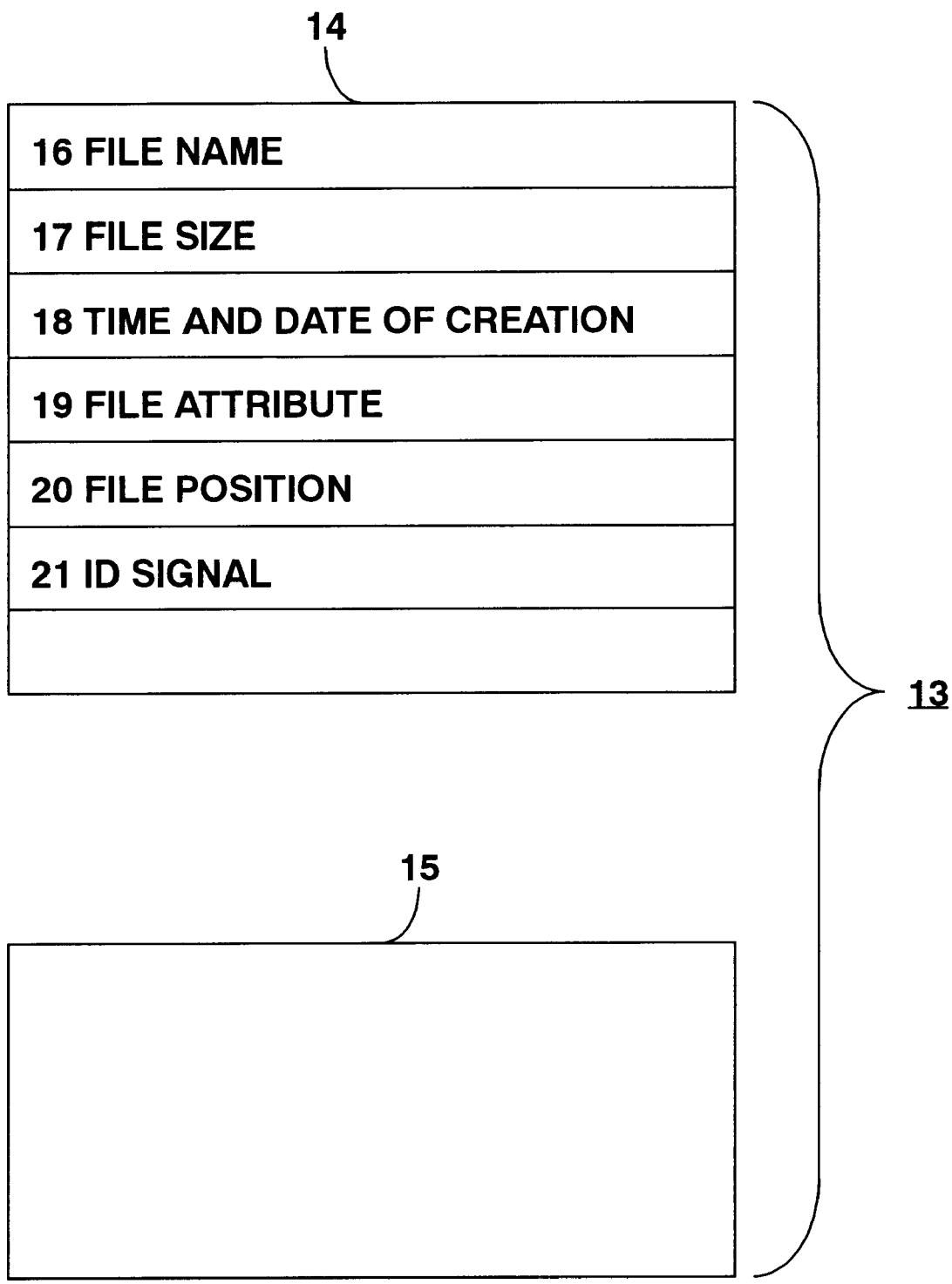
FIG. 7 shows a configuration of computer file according to the embodiment of the present invention.

FIG. 7 is a configuration of a computer file 13. The computer file 13 is provided with an identification (ID) signal, which indicates whether or not a relevant logical sector number is left unused without writing data into a linear replacement sector and is memorized in the storage device 6. The computer file 13 is composed of file managing information 14 and file data 15. The file managing information 14 includes a file name 16, a file size 17, a time and date of creation 18, file attribute 19 indicating such a invisible file, file position information 20 recorded in a medium, and an ID signal 21, which indicates whether or not a relevant logical sector number is left unused.

Figure 8:
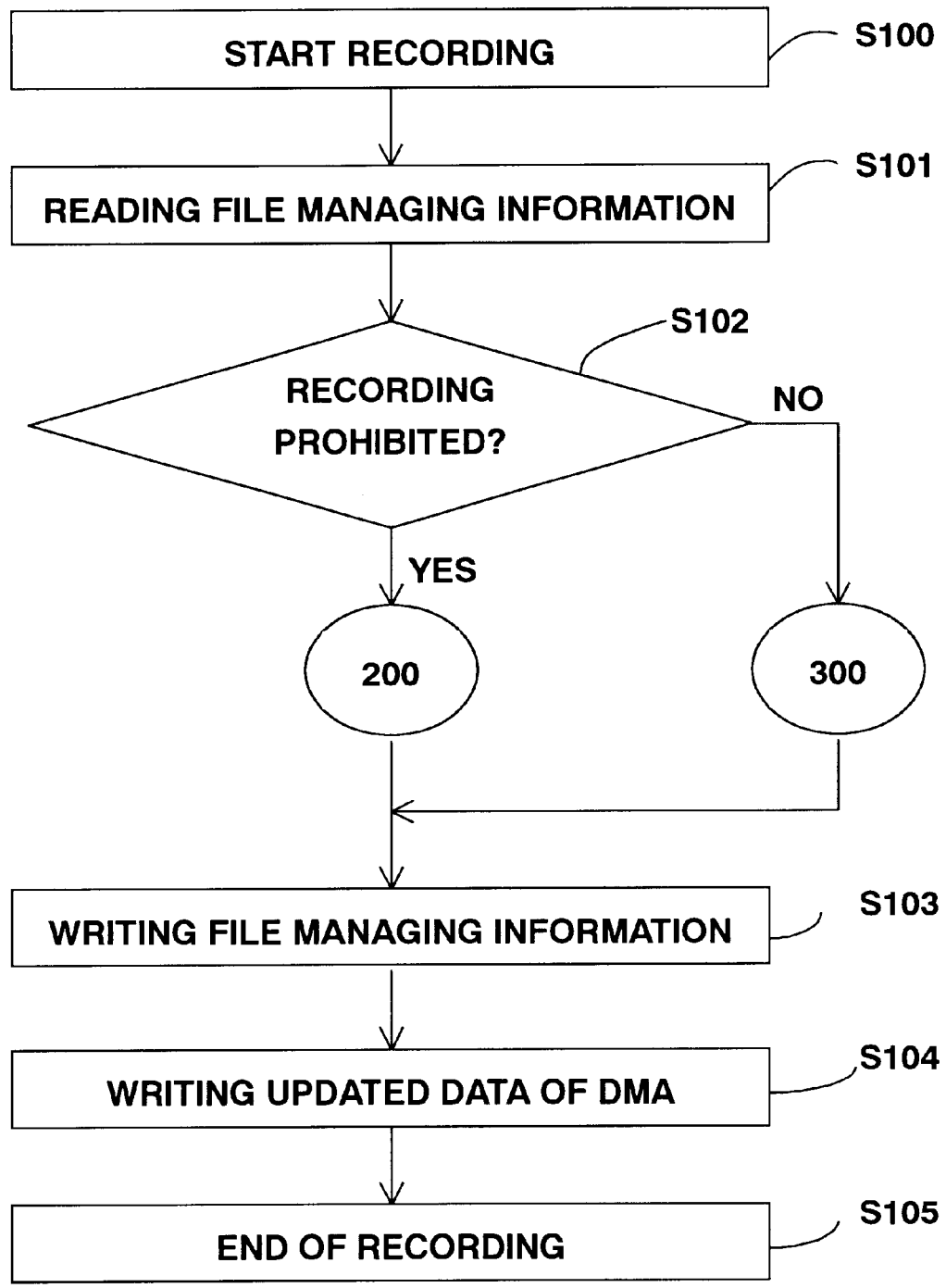
FIG. 8 shows a flow chart of a main program of recording process by a method according to the embodiment of the present invention.
Figure 9:
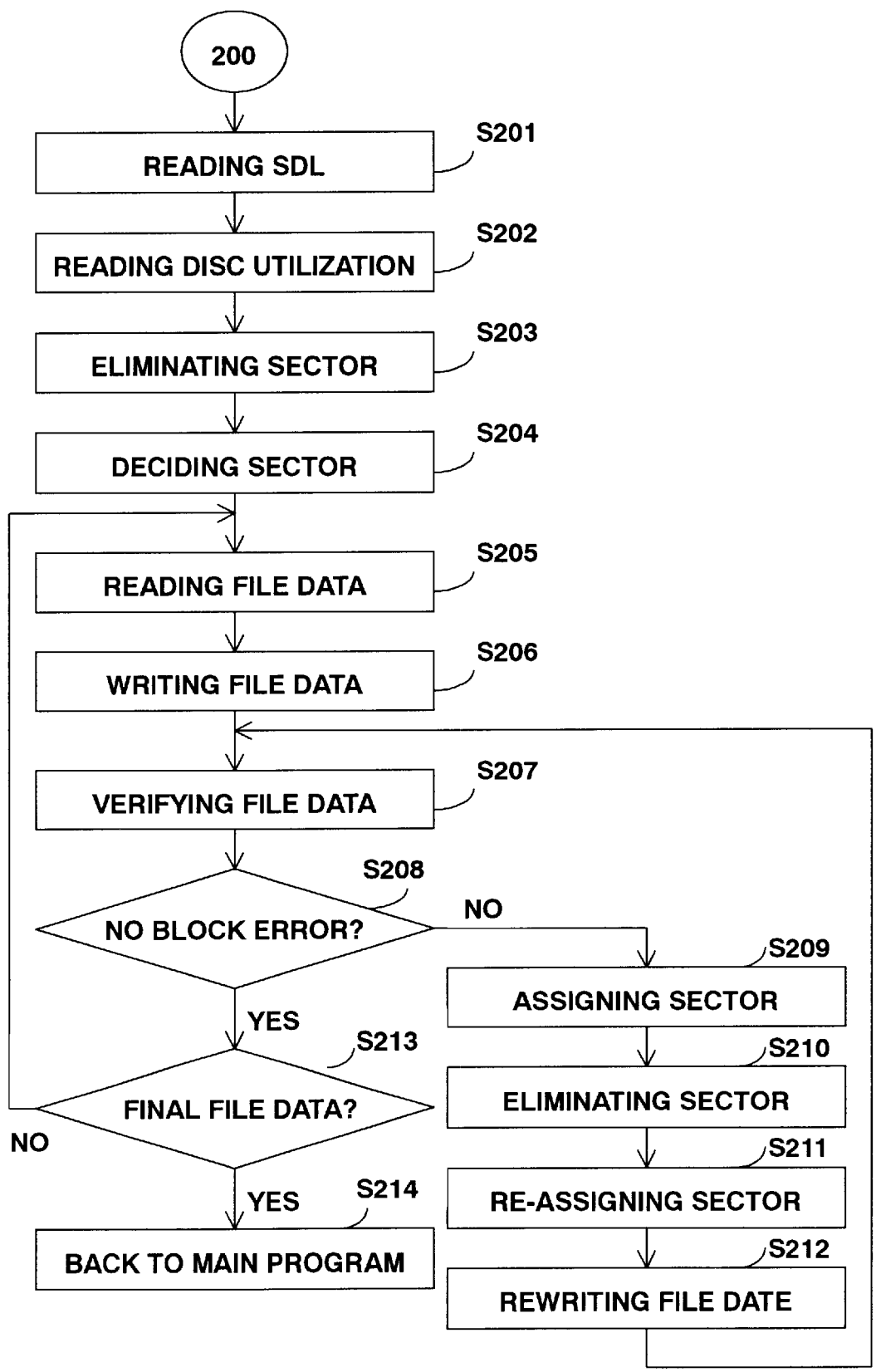
FIG. 9 shows a flow chart of depicting a recording process according to the embodiment of the present invention.
Figure 10:
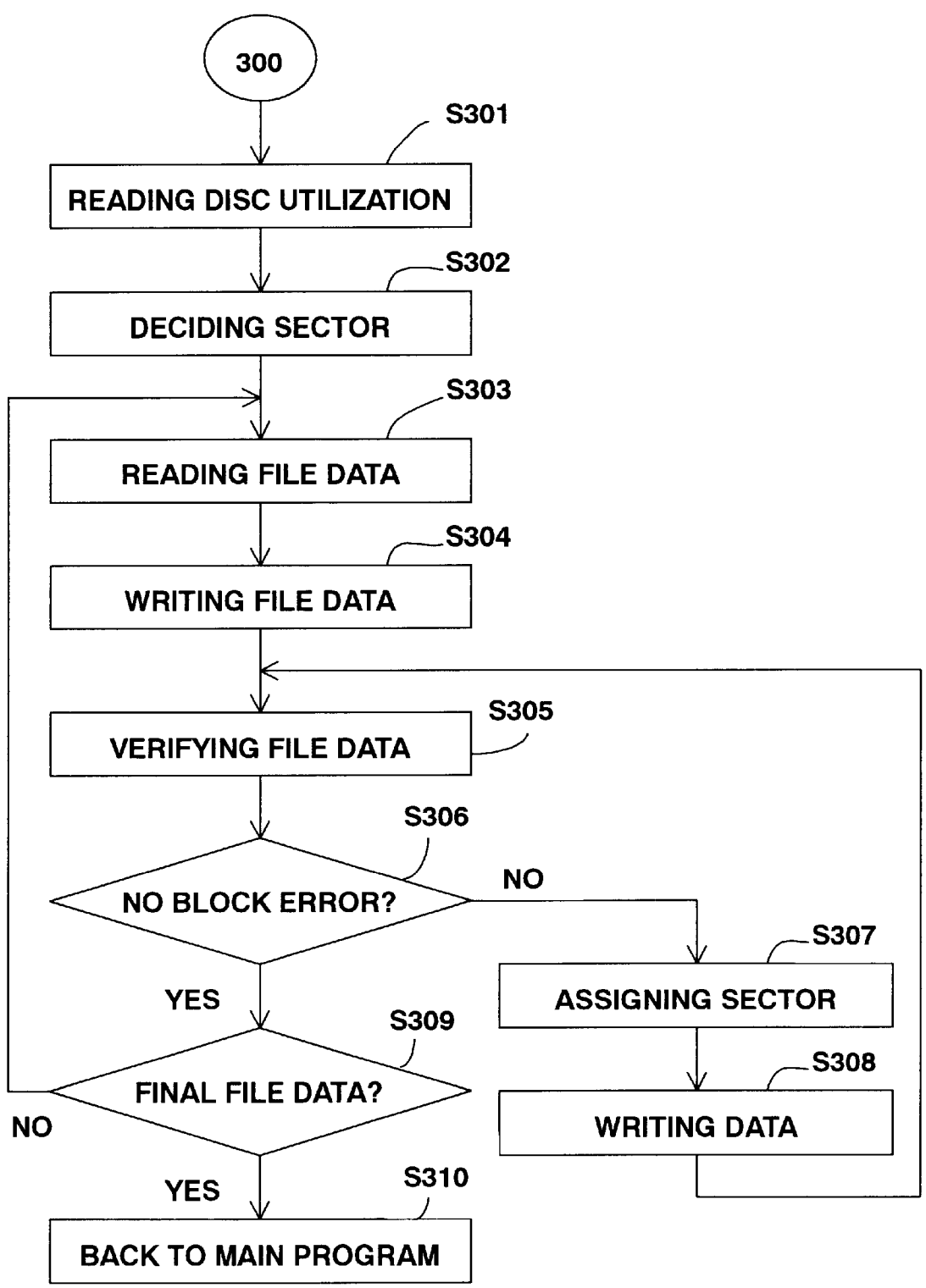
FIG. 10 shows a flow chart of depicting a recording process according to the embodiment of the present invention.

A method of recording information into the optical disc 3 by the recording/reproducing system 1 is depicted with referring flow charts shown in FIGS. 8, 9 and 10 showing processing steps in the host computer 2. In addition thereto, a program executing these processes and the computer file 13 being recorded into the optical disc 3 are stored in the storage device 6.

FIG. 8 depicts a main program of recording process. In FIG. 8, a recording mode starts (step S100). The host computer 2 reads out the file managing information 14 of the computer file 13 to be written into the optical disc 3 (step S101). The ID signal 21, which indicates whether or not a relevant logical sector number is left unused without writing into a linear replacement sector, is discriminated and writing into a linear replacement sector is judged (step S102). In case that writing into the linear replacement sector is inhibited, the control is forward to a process "200". In case of not inhibited, the control is forward to a process "300".

The process "200" is depicted in FIG. 9. In the process "200" shown in FIG. 9, data of a secondary defect list (SDL) included in a defect managing area (DMA) are read out from the optical disc 3 (step S201) and a logical block having a linear replacement sector is recognized. A region indicating a utilization condition of a logical block is read out from the optical disc 3 (step S202) and a logical sector number of a recordable sector is recognized. A sector utilizing a linear replacement sector with the logical sector number of the recordable sector is eliminated (step S203) and a sector to be recorded is decided (step S204). Once a sector to be recorded is decided, a predetermined number of bytes of file data is read out from the storage device 6 and written into the RAM 8 (step S205), and then the file data is recorded in a sector provided in the optical disc 3 (step S206).

The file data recorded in the sector is verified (step S207). In case that the logical block includes more errors than specified as a result of verification, it is judged that a block error is presented (step S208) and a linear replacement sector is assigned (step S209). Then the data from the logical block in which a block error is presented is rewritten with data from a normal logical block. In this case, the sector utilizing the linear replacement sector, which is assigned in the step S209, is eliminated (step S210). A sector to be recorded is re-assigned (step S211) and rewritten with the data (step S212). Then the process returns back to the step S207. The process of steps S207 through S212 is repeated as long as a block error is presented.

In case that a block error is not presented in the step S208, it is judged whether or not data are recorded as far as an end of the computer file (step S213). In case that recording until the end of the computer file is not completed, the process returns back to the step S205 and repeats the steps S205 through S213. In case that recording is completed as far as the end of the computer file, the process returns back to the main program (step S214).

The process "300" is depicted in FIG. 10. In FIG. 10, a region, which indicates a utilization condition of a logical block in the optical disc 3, is read out (step S301) and a region to be recorded is decided (step S302). Once a sector to be recorded is decided, a predetermined number of bytes of file data is read out from the storage device 6 and written into the RAM 8 (step S303), and then the file data is written in a sector provided in the optical disc 3 (step S304).

The file data recorded in the sector is verified (step S305). In case that the logical block includes more errors than specified as a result of verification, it is judged that a block error is presented (step S306) and a linear replacement sector is assigned (step S307). Then the data of the logical block in which a block error is presented is written into a linear replacement sector (step S308). Then the process returns back to the step S305. The process of steps S305 through S308 is repeated as long as a block error is presented.

In case that a block error is not presented in the step S306, it is judged whether or not data are recorded as far as an end of the computer file (step S309). In case that recording until the end of the computer file is not completed, the process returns back to the step S303 and repeats the steps S303 through S309. In case that recording is completed as far as the end of the computer file, the process returns back to the main program (step S310).

Referring back to FIG. 8, when the control performed in the process "200" or "300" is returned back to the main program, an updated file managing information 14 is written into a predetermined region in the optical disc 3 (step S103). Further, an updated data of DMA is written into a predetermined region in the optical disc 3 (step S104), and then the recording mode comes to end (step S105).

According to the aspect of the present invention, a linear replacement sector is not utilized in response to an ID signal, which indicates whether or not a relevant logical sector number is left unused, without writing data into a linear replacement sector when the data is written in. Deterioration of reading rate, which is caused by reciprocal movement of an optical head from a user region to a spare region and vice versa, can be eliminated while reproducing data recorded with the above-mentioned process. Accordingly, by utilizing the information recording method of an optical disc in accordance with the present invention, a file, which is preferred to be continuously reproduced, such as a digital video file can be satisfactorily recorded or reproduced.

Assigning a linear replacement sector to a sector in a defective block, which is detected during verification, is regularly registered on a SDL (Secondary Defect List) of a DMA (Defect Management Area) in an optical disc. A registered logical block is left unused and can be reused. In addition thereto, it is more effective that a file is rearranged prior to recording so as to secure continuing regions.

As mentioned above, by utilizing the information recording method of an optical disc in accordance with the present invention, data of being concerned about deterioration of reading rate can be selectively eliminated by a process of linear replacement, which is a process of replacement sector to a secondary defective sector in an optical disc.

What is claimed is:

1. An information recording method of an optical disc, which performs a linear replacement process as a process of a replacement sector to a secondary defective sector in a rewritable data area provided in a rewritable optical disc, said information recording method comprising the steps of:
   reading out file managing information from a file to be recorded on said rewritable optical disc:
   judging whether or not writing file data into a linear replacement sector is prohibited in accordance with discriminating an identification signal of said file managing information:
   writing said file data into said rewritable data area of said rewritable optical disc in accordance with result of judgement at said step of judging; and
   writing said file managing information into said rewritable data area of said rewritable optical disc,
   wherein, in case that writing said file into a linear replacement sector is prohibited at said step of judging, said information recording method further comprising the steps of:
      eliminating a linear replacement sector;
      deciding a sector to be recorded;
      reading out said file data from a storage device;
      writing said file data into a sector in said rewritable optical disc;
      verifying said file data;
      judging whether or not a block error is presented; and
      judging whether or not said file data is final,
      said information recording method is further characterized by whether or not writing said file data into said replacement sector for substituting said secondary defective sector is performed when said file data is written into said rewritable data area.

2. The information recording method of an optical disc in accordance with claim 1, in case that writing said file into a linear replacement sector is enabled at said step of judging, said information recording method further comprising the steps of:
   deciding a sector to be recorded;
   reading out said file data from a storage device;
   writing said file data into a sector in said rewritable optical disc;
   verifying said file data;
   judging whether or not a block error is presented; and
   judging whether or not said file data is final.

3. An information recording apparatus of an optical disc, which performs a linear replacement process as a process of a replacement sector to a secondary defective sector in a rewritable data area provided in a rewritable optical disc, said information recording apparatus comprising:
   means for reading out file managing information from a file to be recorded on said rewritable optical disc;
   means for judging whether or not writing file data into a linear replacement sector is prohibited in accordance with discriminating an identification signal of said file managing information;

means for writing said file data into said rewritable data area of said rewritable optical disc in accordance with result of judgement by said means for judging; and another means for writing file managing information into said rewritable data area of said rewritable optical disc.

wherein, in case that writing said file into a linear replacement sector is prohibited by said means for judging, said information recording apparatus further comprising:

means for eliminating a linear replacement sector;
means for deciding a sector to be recorded;
means for reading out said file data from a storage device;
means for writing said file data into a sector in said rewritable optical disc;
means for verifying said file data;
means for judging whether or not a block error is presented; and
another means for judging whether or not said file data is final, said information recording apparatus is further characterized by whether or not writing said file data into said replacement sector for substituting said secondary defective sector is performed when said file data is written into said rewritable data area.

4. The information recording apparatus of an optical disc in accordance with claim 3, in case that writing said file into a linear replacement sector is enabled at said means for judging, said information recording apparatus further comprising:

means for deciding a sector to be recorded;
means for reading out said file data from a storage device;
means for writing said file data into a sector in said rewritable optical disc;
means for verifying said file data;
means for judging whether or not a block error is presented; and
means for judging whether or not said file data is final.

* * * * *